United States Patent [19]

Thevenet et al.

[11] Patent Number: 5,050,032

[45] Date of Patent: Sep. 17, 1991

[54] SEALED ENVELOPE BASED ON A FILAMENTARY WINDING, AND APPLICATION TO A COMPOSITE LIGHTNING ARRESTER

[75] Inventors: Guy Thevenet, Beaumont-les-Randan; Denis Thuillier, Vichy; René Parraud, Chateldon, all of France

[73] Assignee: Sediver Societe Europeenne d'Isolateurs en Verre et Composite, France

[21] Appl. No.: 522,800

[22] Filed: May 14, 1990

[30] Foreign Application Priority Data

May 12, 1989 [FR] France .............................. 89 06268

[51] Int. Cl.[5] .............................................. H02H 1/04

[52] U.S. Cl. .................................... 361/117; 361/127

[58] Field of Search ............... 361/117, 127, 119, 126, 361/128, 132; 363/57; 174/140 R, 150, 2; 338/20, 21, 71, 99

[56] References Cited

U.S. PATENT DOCUMENTS

| | | | |
|---|---|---|---|
| 4,656,555 | 4/1987 | Raudabaugh | 361/117 |
| 4,864,456 | 9/1989 | Thuillier | 361/126 |
| 4,899,248 | 2/1990 | Raudabaugh | 361/127 |
| 4,905,118 | 2/1990 | Sakich | 361/117 |

FOREIGN PATENT DOCUMENTS

| | | |
|---|---|---|
| 0304690 | 3/1989 | European Pat. Off. . |
| 3544141 | 12/1985 | Fed. Rep. of Germany . |

*Primary Examiner*—A. D. Pellinen
*Assistant Examiner*—S. W. Jackson
*Attorney, Agent, or Firm*—Kenyon & Kenyon

[57] ABSTRACT

A sealed envelope based on a filamentary winding constituted by resin-impregnated glass fibers, for equipment likely to be subjected to large thermal stresses and thus to be the seat of internal excess pressures, the winding adhering to the outside surface of the equipment, wherein the outside surface of the equipment coated with the winding has fiber-free zones forming resin-filled gaps, with the percentage of the surface area not covered with fibers being not less than about 15%.

7 Claims, 2 Drawing Sheets

SEALED ENVELOPE BASED ON A FILAMENTARY WINDING, AND APPLICATION TO A COMPOSITE LIGHTNING ARRESTER

The present invention relates to a sealed envelope based on a filamentary winding, for equipment likely to be subjected to large thermal stresses or to electrical arcing phenomena, and thus to be the seat of internal excess pressures.

Such equipment may be a circuit breaker, a lighting arrester, etc.

BACKGROUND OF THE INVENTION

A sealed envelope based on a filamentary winding of glass fibers impregnated with resin is described, for example, in French patent number 2 619 244 protecting a lightning arrester (c.f. U.S. Pat. No. 4,864,456). According to that patent, a stack is initially built up from pellets of a varistor type material, spacers, end fittings, and means for ensuring electrical continuity both between the pellets themselves and between the pellets and the end fittings; a filamentary winding of resin-impregnated glass fibers is then formed around the assembly so as to ensure bonding and radial binding of said stack without significant longitudinal compression. After the resin of the envelope formed in this way has set, a coating of EPDM type elastomer material is injected thereover.

The function of the winding is to hold the pellets together by having a high degree of adhesion on their side surfaces and having very high mechanical strength in the radial direction.

It may happen that an internal short circuit of several kilo-amps is initiated from pellets that are electrically weakened or partially short-circuited.

This gives rise to excessive heating and to a very large increase in internal pressure.

Regardless of circumstances, safety reasons require that no part of the equipment can be expelled from the envelope.

However, there can be no question of installing valves which would be far too complex for equipment considered as "consumable".

The object of the present invention is to propose a type of envelope suitable for solving this problem.

SUMMARY OF THE INVENTION

The present invention provides a sealed envelope based on a filamentary winding constituted by resin-impregnated glass fibers, for equipment likely to be subjected to large thermal stresses and thus to be the seat of internal excess pressures, said winding adhering to the outside surface of said equipment, wherein said outside surface of said equipment coated with said winding has fiber-free zones forming resin-filled gaps, with the percentage of the surface area not covered with fibers being not less than about 15%. This percentage preferably lies in the range 15% to 35%.

When the equipment has an axis of revolution such that a winding angle for said winding can be defined relative thereto, then the angle is preferably chosen to lie in the range 30° to 60°.

The present invention also provides a composite lightning arrester comprising a stack of pellets made of a varistor type material together with end fittings, means for ensuring electrical connection throughout the stack, and an envelope formed by a filamentary winding of resin-impregnated glass fibers providing radial binding of said stack and adhering to the side surface of the stack, said envelope being coated with fins made of injected elastomer, wherein the side surface of said stack has fiber-free zones forming resin-filled gaps and occupying not less than about 15% of its surface area.

BRIEF DESCRIPTION OF THE DRAWINGS

Embodiments of the invention are described by way of example with reference to the accompanying drawings, in which.

DETAILED DESCRIPTION

Figure 1:
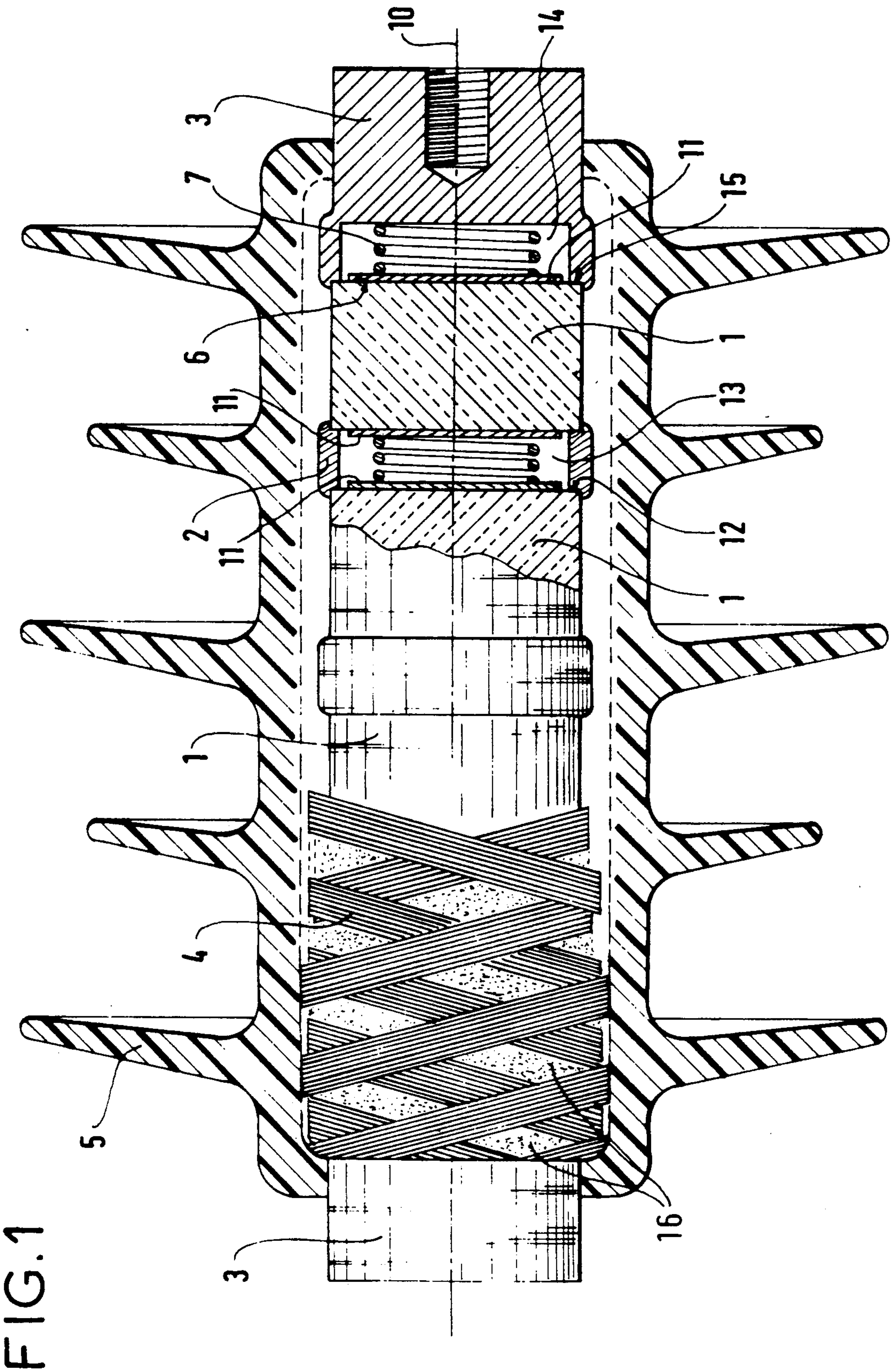
FIGS. 1 and 2 are diagrammatic fragmentary section views through lightning arresters of the invention.

As can be seen in FIG. 1, the starting components are two end fittings 3 and a set of zinc oxide pellets 1 which are metal-coated on their plane faces 6. A stack is made about a common axis 10 with tubular spacers 2 made of metal or of insulating material being interposed between the pellets 1. The spacers have inside housings 13 and recesses 12 for guiding the pellets 1 radially. Similarly, the end fittings 3 have housings 14 and recesses 15.

In order to ensure electrical continuity, metal plates 11 are disposed inside the housings 13 and 14 in contact with the metal-coated faces 6 of the pellets 1 and with low force springs 7.

The entire assembly is put into a device for making a filamentary winding.

Fibers 4 are wound around the stack in such a manner as to constitute tapes forming a trellis-work pattern leaving empty gap zones 16. The gap zones 16 occupy 25% of the surface area of the stack 1. The fibers are impregnated with resin and the zones 16 are filled with the resin. The winding angle relative to the axis 10 lies in the range 30° to 60°.

After the resin has set, the resulting envelope adheres perfectly to the side surfaces of the end fittings 3, of the spacers 2 and of the pellets 1.

This provides radial binding without significant axial compression of the stack as a whole.

During winding, the spacers 2 perform a sealing function and they prevent the resin with which the fibers are impregnated from infiltrating between the pellets 1. The spacers may be made from a resin analogous to the impregnating resin so as to further enhance adhesion of the envelope.

After the envelope has set, a coating of elastomer fins 5 is injected thereabout, with the elastomer being EPDM for example, or some other insulating material.

This mechanical bonding between the envelope and the stack is totally independent of the electrical connection means between the pellets, and between the pellets and the two end fittings 3.

If an internal short circuit occurs at a pellet 1, then the arcing and the gases tend preferentially to escape via the gap zones 16 where the non-reinforced resin may be destroyed. This does not damage the fibers of the winding nor does it damage the overall structure of the lightning arrester. There is thus no danger of the pellets 1 separating from one another, nor is there any danger of a pellet fragment being expelled to the outside. This constitutes an important safety advantage.

Figure 2:
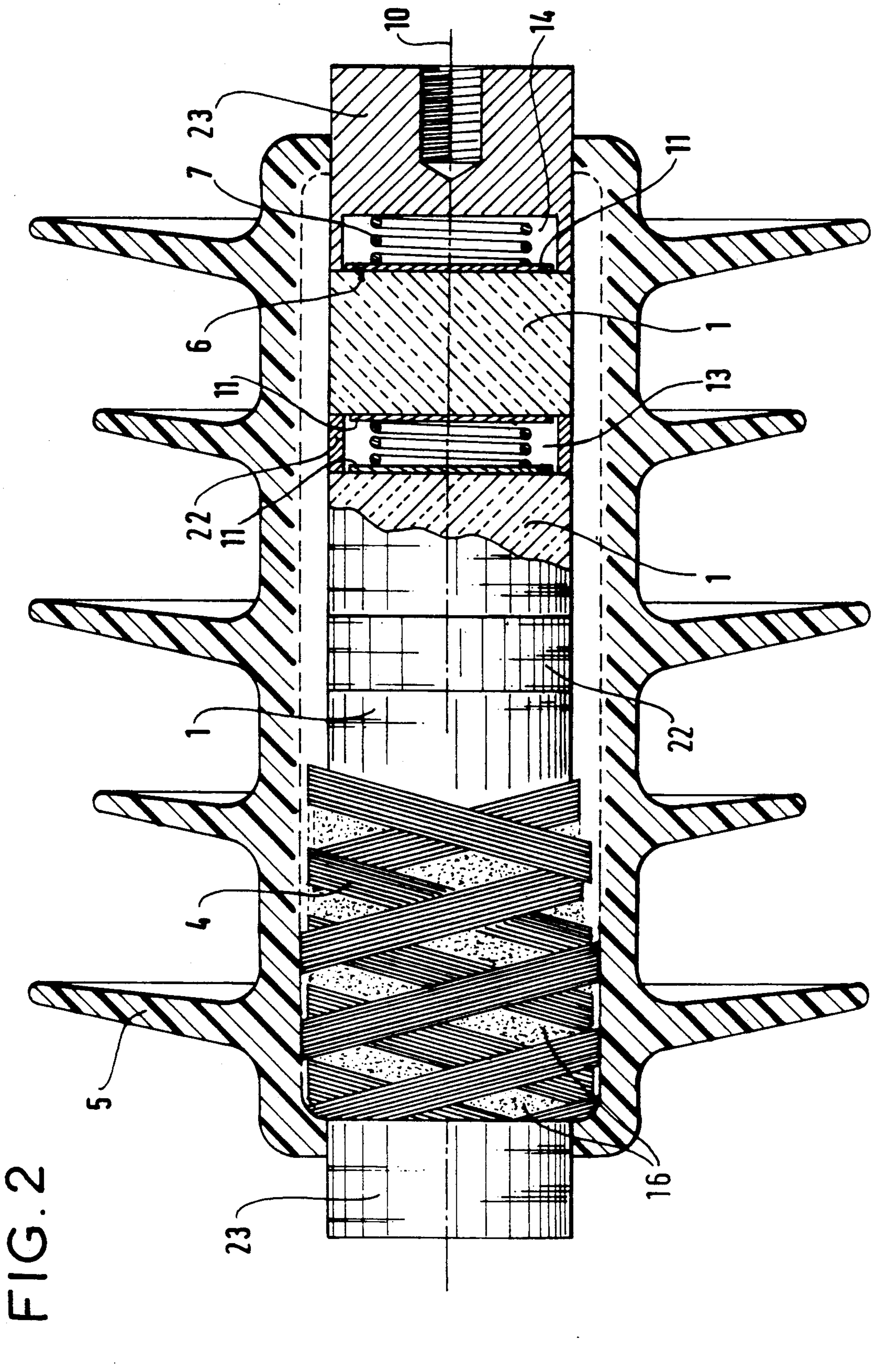

In the variant of FIG. 2, the spacers 22 no longer have recesses 12, but are of the same diameter as the pellets 1 and they are glued to the metal-coated faces 6 of the pellets. The same applies to the end fittings 23.

This disposition prevents resin penetrating between the pellets.

Naturally the present invention is not limited to the embodiments described above. The illustrated method of winding may be replaced by any other disposition leaving a plurality of regularly spaced apart gap zones 16 of arbitrary shape and occupying a total surface area of not less than about 15% to 35% of the side area of the stack.

In addition, the invention applies to any lightning arrester including a filamentary winding, regardless of the internal structure of the arrester. The invention is also applicable to any electrical or other equipment provided with an envelope based on a filamentary winding.

We claim:

1. A sealed envelope based on a filamentary winding constituted by resin-impregnated glass fibers, for equipment likely to be subjected to large thermal stresses and thus to be the seat of internal excess pressures, said winding adhering to the outside surface of said equipment, wherein said outside surface of said equipment coated with said winding has fiber-free zones forming resin-filled gaps, with the percentage of the surface area not covered with fibers being not less than about 15%.

2. A sealed envelope according to claim 1, wherein said percentage lies in the range 15% to 35%.

3. A sealed envelope according to claim 1, wherein said equipment has an axis of revolution and the winding angle of said winding relative to said axis lies in the range 30° to 60°.

4. A composite lightning arrester comprising a stack of pellets made of a varistor type material together with end fittings, means for ensuring electrical connection throughout the stack, and an envelope formed by a filamentary winding of resin-impregnated glass fibers providing radial binding of said stack and adhering to the side surface of the stack, said envelope being coated with fins made of injected elastomer, wherein the side surface of said stack has fiber-free zones forming resin-filled gaps occupying not less than about 15% of its surface area.

5. A composite lightning arrester according to claim 4, wherein said percentage lies in the range 15% to 35%.

6. A composite lightning arrester according to claim 4, wherein the winding angle of said filamentary winding relative to the axis of said stack lies in the range 30° to 60°.

7. A composite lightning arrester according to claim 4, wherein said pellets have metal-coated faces, said pellets are separated by spacers having substantially the same diameter as the pellets and glued to said metal-coated faces, and said electrical connection means include low-force springs associated with metal plates applied against respective ones of said metal-coated faces.

* * * * *